US012810566B2

(12) United States Patent
Juarez et al.

(10) Patent No.: US 12,810,566 B2
(45) Date of Patent: Nov. 24, 2026

(54) SYSTEMS AND METHODS FOR ADJUSTING MODEL LOCATIONS AND SCALES USING POINT CLOUDS

(71) Applicant: Insurance Services Office, Inc., Jersey City, NJ (US)

(72) Inventors: Javier Juarez, Móstoles (ES); Ismael Aguilera Martin de los Santos, Coslada (ES)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/571,961

(22) Filed: Jan. 10, 2022

(65) Prior Publication Data

US 2022/0222909 A1 Jul. 14, 2022

Related U.S. Application Data

(60) Provisional application No. 63/135,004, filed on Jan. 8, 2021.

(51) Int. Cl.
*G06T 19/20* (2011.01)
*G06T 3/02* (2024.01)
*G06T 17/05* (2011.01)

(52) U.S. Cl.
CPC ................ *G06T 19/20* (2013.01); *G06T 3/02* (2024.01); *G06T 17/05* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 7,215,430 B2 * 5/2007 Kacyra .................. G01S 17/89 356/601
9,070,216 B2 * 6/2015 Golparvar-Fard .... G06T 19/006
(Continued)

FOREIGN PATENT DOCUMENTS

CN 106937532 A 7/2017
CN 109544677 A 3/2019
WO 2020/223594 A2 11/2020

OTHER PUBLICATIONS

Wikipedia, "Translation (geometry)", retrieved Jan. 30, 2025, wikipedia.org, pp. 2-3 (Year: 2025).*
(Continued)

*Primary Examiner* — Kent W Chang
*Assistant Examiner* — Jonathan M Cofino
(74) *Attorney, Agent, or Firm* — McCarter & English, LLP

(57) ABSTRACT

Systems and methods for adjusting the location and scale of a three-dimensional ("3D") model of an object to conform to a georeferenced point cloud are provided herein. The 3D model and the georeferenced point cloud are rendered in a shared 3D coordinate system and the 3D model and the georeferenced point cloud are aligned from a first point of view. An affine transformation matrix is calculated based on a best fitting plane of the point cloud and a corresponding face of the 3D model to align the best fitting plane and the corresponding face of the 3D model. The affine transformation matrix is then applied to all coordinates of the 3D model to generate a new 3D model that aligns with the georeferenced point cloud from a second point of view.

27 Claims, 13 Drawing Sheets

(56) References Cited

U.S. PATENT DOCUMENTS

| | | | | |
|---|---|---|---|---|
| 10,346,687 | B2 * | 7/2019 | Pestun | G06V 20/182 |
| 2005/0099637 | A1 | 5/2005 | Kacyra et al. | |
| 2013/0155058 | A1 | 6/2013 | Golparvar-Fard et al. | |
| 2016/0004795 | A1 * | 1/2016 | Novak | B64U 10/13 703/1 |
| 2018/0113083 | A1 * | 4/2018 | Van Dael | G01N 23/046 |
| 2018/0218214 | A1 | 8/2018 | Pestun et al. | |
| 2018/0247447 | A1 | 8/2018 | Serna et al. | |
| 2019/0325089 | A1 | 10/2019 | Golparvar-Fard et al. | |
| 2020/0005447 | A1 | 1/2020 | Salgian et al. | |
| 2021/0192271 | A1 * | 6/2021 | Huang | G06F 18/2137 |

OTHER PUBLICATIONS

International Search Report of the International Searching Authority mailed on Apr. 8, 2022, issued in connection with International Application No. PCT/US2022/011780 (3 pages).

Written Opinion of the International Searching Authority mailed on Apr. 8, 2022, issued in connection with International Application No. PCT/US2022/011780 (7 pages).

Extended European Search Report dated Oct. 25, 2024, issued by the European Patent Office in connection with European Patent Application No. EP22737242.2 (12 pages).

Khosravanai, "Automatic Modeling of Building Interiors Using Low-Cost Sensor Systems," Doctoral Thesis, Dec. 9, 2015 (134 pages).

Hsu, et al., "Alignment of Continuous Video onto 3D Point Clouds," IEEE Transactions on Pattern Analysis and Machine Intelligence, vol. 27, No. 8, Aug. 2005 (14 pages).

Ham, et al., "An Automated Vision-Based Method for Rapid 3D Energy Performance Modeling of Existing Buildings Using Thermal and Digital Imagery," Advanced Engineering Informatics (2013) (15 pages).

Bhattacharya, et al., "A Method for Real-Time Generation of Augmented Reality Work Instructions Via Expert Movements," The Engineering of Virtual Reality (2015) (13 pages).

* cited by examiner

SYSTEMS AND METHODS FOR ADJUSTING MODEL LOCATIONS AND SCALES USING POINT CLOUDS

RELATED APPLICATIONS

This application claims priority to U.S. Provisional Patent Application Ser. No. 63/135,004 filed on Jan. 8, 2021, the entire disclosure of which is hereby expressly incorporated by reference.

BACKGROUND

Technical Field

The present disclosure relates generally to the field of computer modeling of structures. More specifically, the present disclosure relates to systems and methods for adjusting model locations and scales using point clouds.

Related Art

Accurate and rapid identification and depiction of objects from digital images (e.g., aerial images, satellite images, etc.) is increasingly important for a variety of applications. For example, information related to various features of buildings, such as roofs, walls, doors, etc., is often used by construction professionals to specify materials and associated costs for both newly-constructed buildings, as well as for replacing and upgrading existing structures. Further, in the insurance industry, accurate information about structures may be used to determine the proper costs for insuring buildings/structures. Still further, government entities can use information about the known objects in a specified area for planning projects such as zoning, construction, parks and recreation, housing projects, etc.

Various systems have been implemented to generate three-dimensional ("3D") models of structures and objects present in the digital images. However, these systems have drawbacks, such as an inability to accurately depict elevation and correctly locate the 3D models on a coordinate system (e.g., geolocation). As such, the ability to generate an accurate 3D model having correct geolocation data is a powerful tool.

Thus, in view of existing technology in this field, what would be desirable is a system that automatically and efficiently processes a 3D model of an object, along with digital imagery and/or geolocation data for the same object, to generate a corrected 3D model of the object present in the digital imagery. Accordingly, the systems and methods disclosed herein solve these and other needs.

SUMMARY

The present disclosure relates to systems and methods for adjusting three-dimensional ("3D") model locations and scales using point clouds. Specifically, the present disclosure includes systems and methods for adjusting a 3D model of an object so that the 3D model conforms to a correctly georeferenced point cloud corresponding to the same object, when rendered in a shared 3D coordinate system, thereby ensuring that the geolocation of the 3D model after adjustment is also correct. The system can include a first database storing a 3D model of an object, a second database storing georeferenced point cloud data corresponding to the object, and a processor in communication with the first and second databases. The processor can be configured to retrieve the 3D model from the first database, retrieve the georeferenced point cloud data from the second database, and render the 3D model and the georeferenced point cloud data in a shared coordinate system, such that the 3D model and the georeferenced point cloud data are aligned from a first point of view. The processor can then calculate an affine transformation matrix based on the 3D model and the georeferenced point cloud data to align the 3D model and the georeferenced point cloud data from a second point of view. Finally, the processor applies the affine transformation matrix to the 3D model to generate a new 3D model.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for adjusting model locations and scales using point clouds, as described in detail below in connection with FIGS. 1-13. Specifically, the embodiments described below allow for adjustment of a 3D model of an object so that the 3D model conforms to a correctly georeferenced point cloud corresponding to the same object, when rendered in a shared 3D environment (e.g., coordinate system). Thus, the geolocation of the 3D model is also correct after adjustment.

According to the embodiments of the present disclosure, the 3D model can represent a complete object (e.g., a building, structure, device, toy, etc.) or a portion thereof, and can be generated by any means known to those of ordinary skill in the art. For example, the 3D model could be built manually by an operator using computer-aided design (CAD) software, or generated through semi-automated or fully-automated systems, including but not limited to, technologies based on heuristics, computer vision, and machine learning. It should also be understood that the point cloud corresponding to the object, as described herein, is correctly georeferenced and can also be generated by various means, such as being extracted from stereoscopic image pairs, captured by a system with a 3D sensor (e.g., LiDAR), or other mechanisms for generating georeferenced point clouds known to those of ordinary skill in the art.

Figure 1:
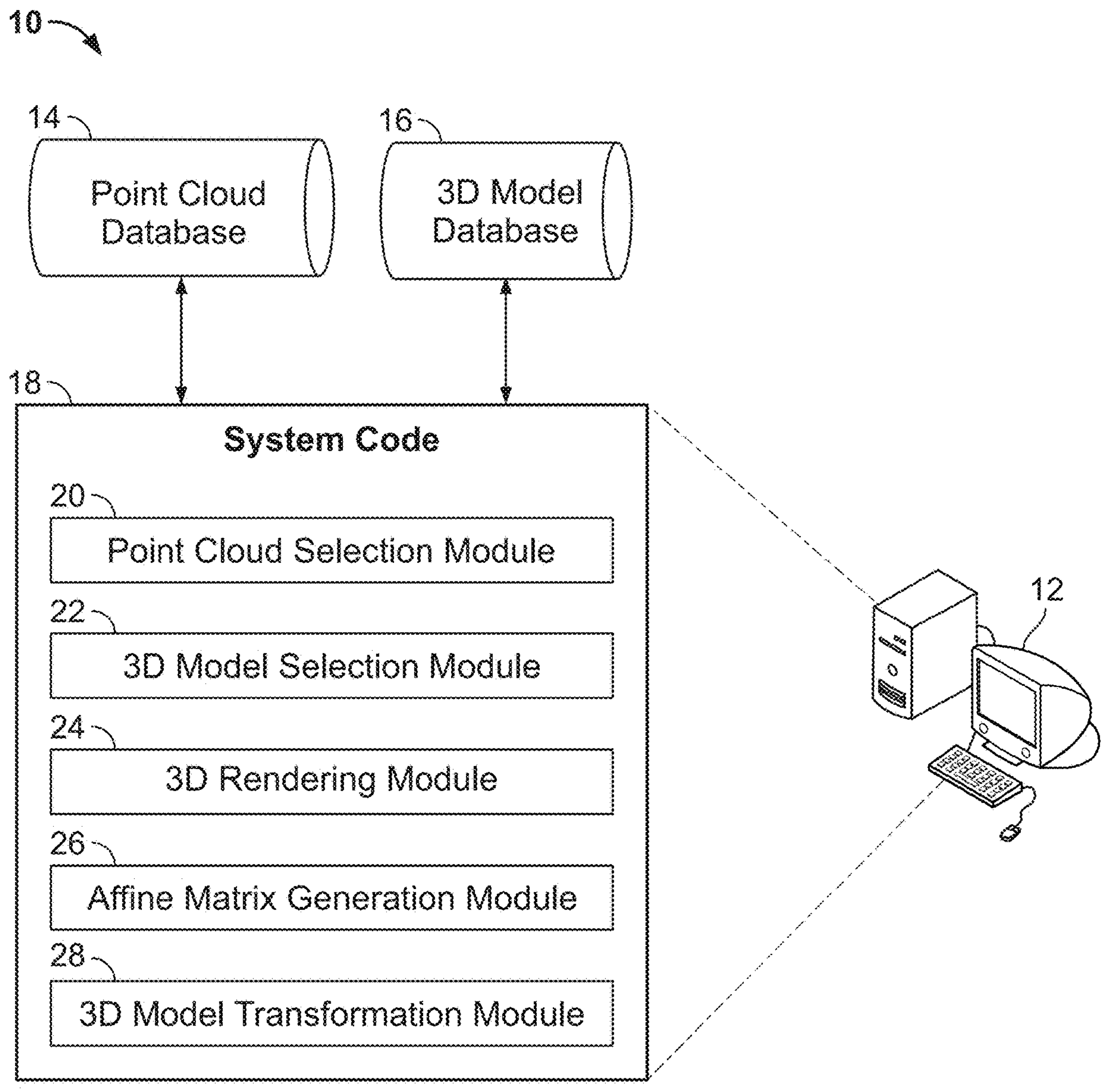
FIG. 1 is a diagram illustrating the system of the present disclosure.

FIG. 1 is a diagram illustrating hardware and software components capable of being utilized to implement the system 10 of the present disclosure. The system 10 could be embodied as a central processing unit 12 (e.g., a hardware processor) coupled to one or more of a point cloud database 14 and a 3D model database 16. The hardware processor 12 executes system code which generates an affine transformation matrix based on a 3D model of an object and a point cloud of the same object and applies the affine transformation matrix to the 3D model, such that the 3D model matches the point cloud when observed from any point of view when rendered in a shared 3D environment. The hardware processor 12 could include, but is not limited to, a personal computer, a laptop computer, a tablet computer, a smart telephone, a server, and/or a cloud-based computing platform.

The system 10 includes system code 18 (i.e., non-transitory, computer-readable instructions) stored on a computer-readable medium and executable by the hardware processor or one or more computer systems. The code 18 could include various custom-written software modules that carry out the steps/processes discussed herein, and could include, but is not limited to, a point cloud selection module 20, a 3D model selection module 22, a 3D rendering module 24, an affine matrix generation module 26, and a 3D model transformation module 28. The code 18 could be programmed using any suitable programming language including, but not limited to, C, C++, C#, Java, Python, or any other suitable language. Additionally, the code 18 could be distributed across multiple computer systems in communication with each other over a communications network, and/or stored and executed on a cloud computing platform and remotely accessed by a computer system in communication with the cloud platform. The code 18 could communicate with the point cloud database 14 and 3D model database 16, which could be stored on the same computer system as the code 18, or on one or more other computer systems in communication with the code 18.

Still further, the system 10 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

Figure 2:
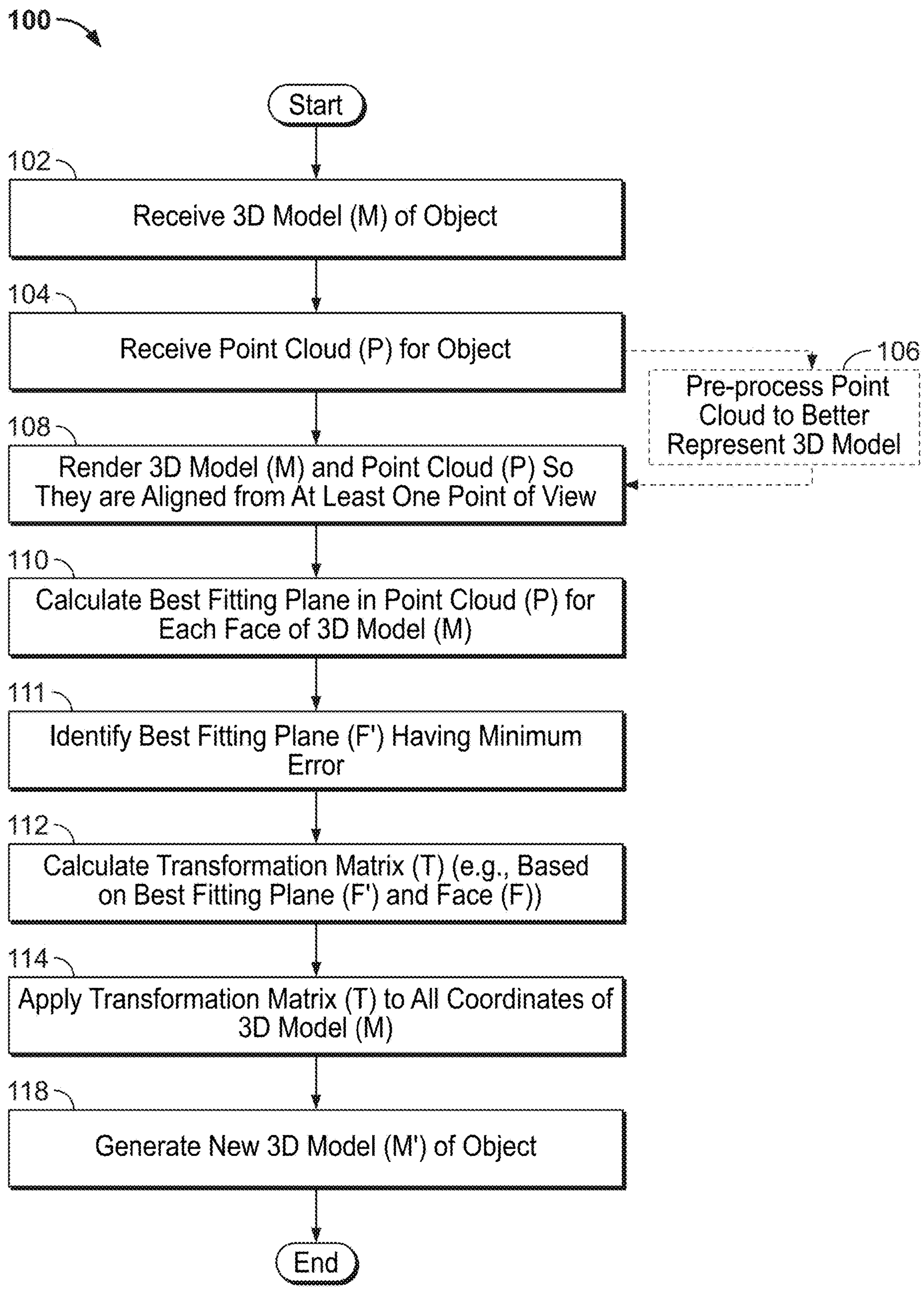
FIG. 2 is a flowchart illustrating overall process steps carried out by the system of the present disclosure.

FIG. 2 is a flowchart illustrating the overall process steps 100 carried out by the system 10 of the present disclosure. In step 102, the system 10 receives a 3D model of an object and in step 104, the system 10 receives point cloud data corresponding to the same object. According to some embodiments of the present disclosure, the system 10 can retrieve the 3D model from the 3D model database 16 and can retrieve the point cloud data from the point cloud database 14 based on a geospatial region of interest ("ROI") specified by a user that corresponds to the 3D model and point cloud. For example, a user can input latitude and longitude coordinates of an ROI. Alternatively, a user can input an address or a world point of an ROI. The geospatial ROI can also be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art will understand that other methods can be used to determine the bounds of the polygon and/or to select the 3D model and point cloud. Optionally, in step 106, the system 10 can pre-process the point cloud to more closely represent the 3D model, such as by performing RGB, category, or outlier filtering thereon.

Figure 3B:
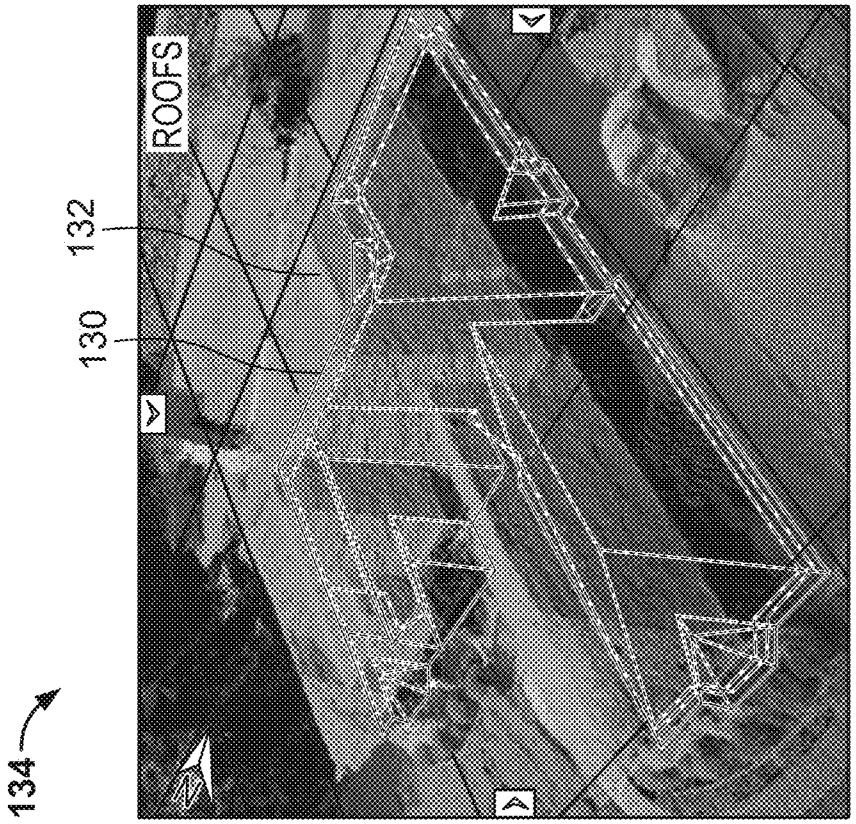
FIGS. 3A-4B are diagrams illustrating processing step 108 of FIG. 2.
Figure 3A:
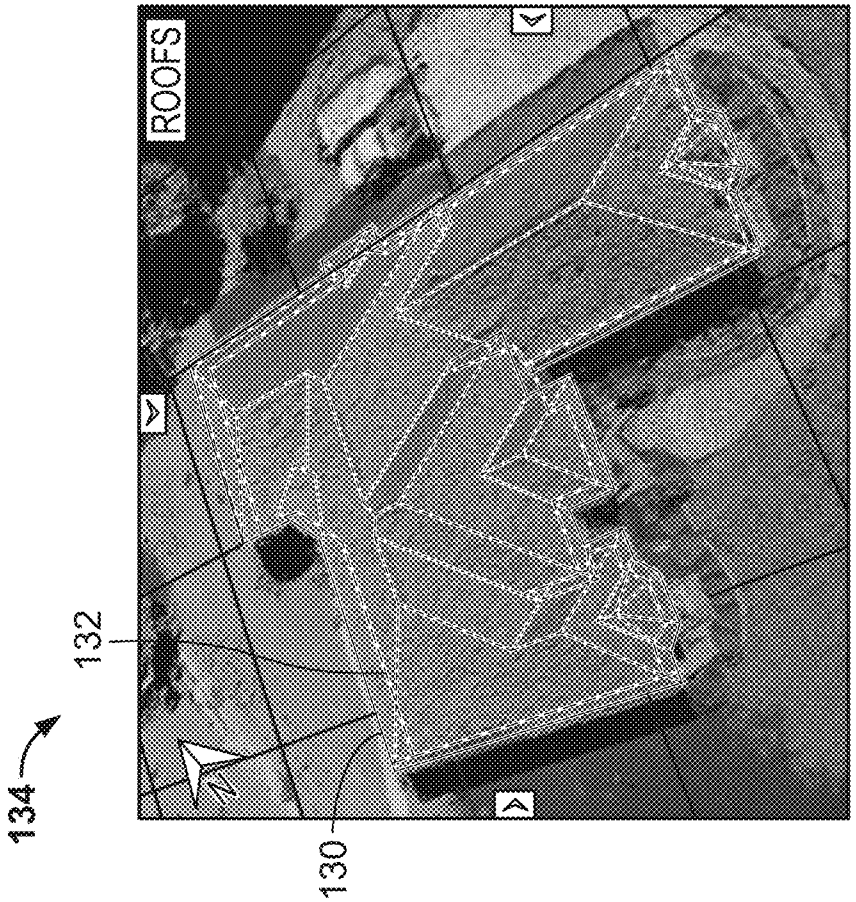
Figure 4A:
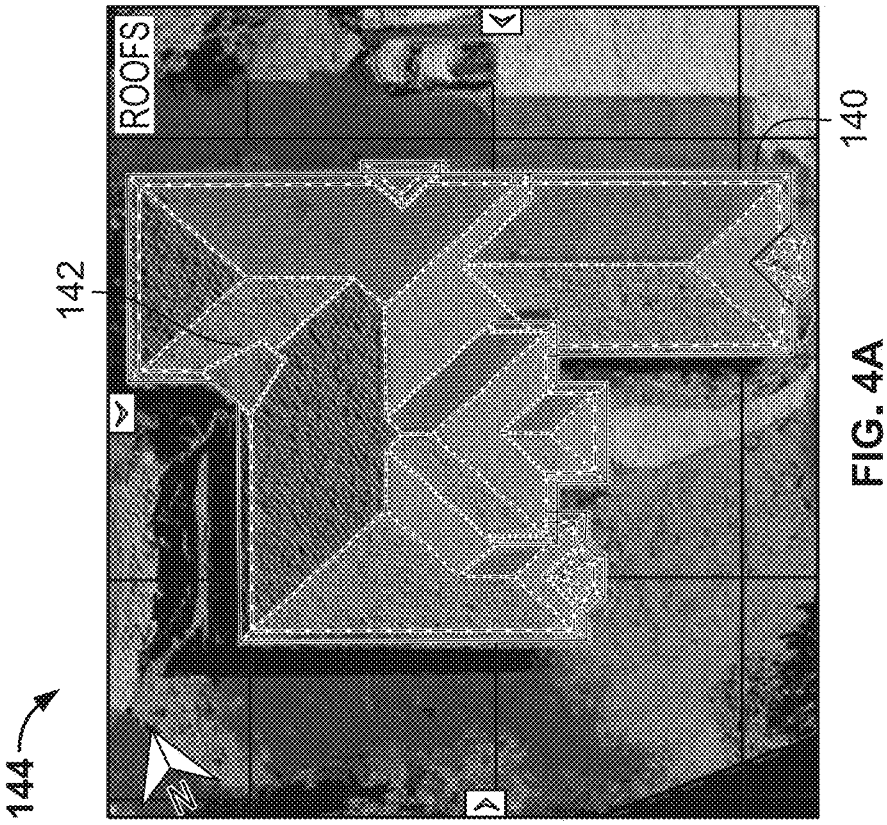
Figure 4B:
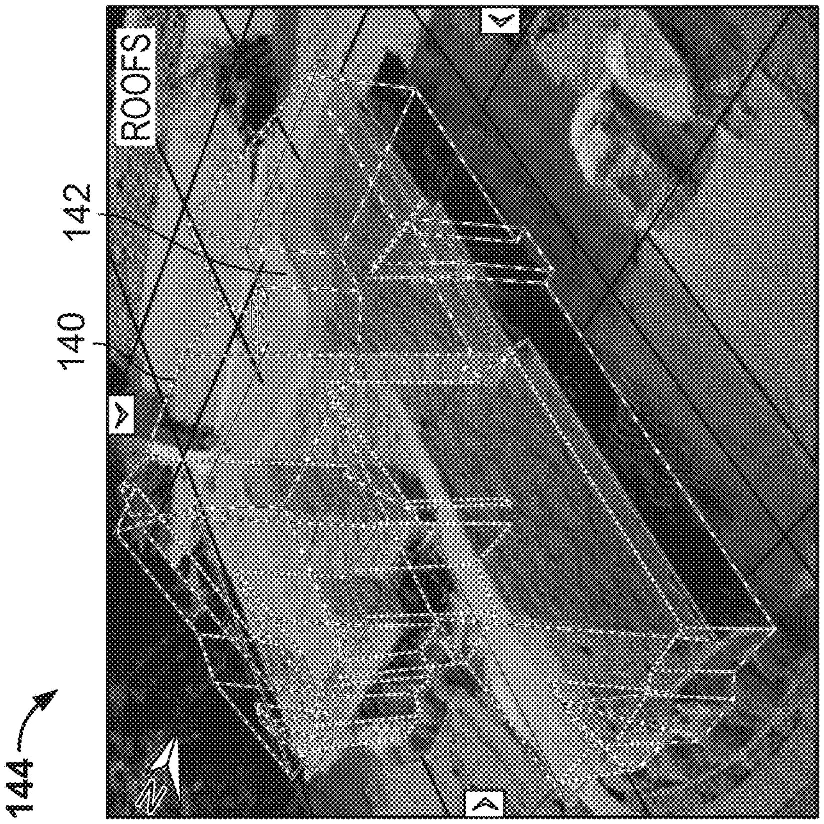

In step 108, the system 10 renders the 3D model and the point cloud in a shared 3D environment, such that the 3D model and the point cloud are aligned from at least one point of view (e.g., orthogonal or perspective). However, it should be understood that the 3D model and the point cloud may be misaligned from a different point of view. For example, FIGS. 3A-4B are diagrams illustrating the processing step 108 of FIG. 2. Specifically, FIG. 3A shows a 3D model 130 and a point cloud 132 rendered in a shared 3D environment 134 and observed from a first perspective point of view and FIG. 3B shows the 3D model 130 and the point cloud 132 rendered in the shared 3D environment 134 and observed from a second (different) perspective point of view. As shown in FIG. 3A, the 3D model 130 is substantially aligned with the point cloud 132 when observed from the first perspective point of view, however, as shown in FIG. 3B, the 3D model 130 is misaligned with the point cloud 132 when observed from the second perspective point of view. Similarly, FIG. 4A shows a 3D model 140 and a point cloud 142 rendered in a shared 3D environment 144 and observed from a first vertical orthogonal point of view and FIG. 4B shows the 3D model 140 and the point cloud 142 rendered in the shared 3D environment 144 and observed from a second perspective point of view. As shown in FIG. 4A, the 3D model 140 is substantially aligned with the point cloud 142 when observed from the first vertical orthogonal point of view, however, as shown in FIG. 4B, the 3D model 140 is misaligned with the point cloud 142 when observed from the second perspective point of view. Additionally, it should be noted that the geolocation of the 3D model 140 shown in FIGS. 4A and 4B is correct, but the roof slope is wrong (e.g., the Z scale of the model 140 is incorrect).

The system of the present disclosure aligns the 3D model 130 with the point cloud 132 from at least one point of view. As discussed herein, a point of view can be an orthometric or perspective view, can be directed at the 3D model and point cloud from any distance, scale and orientation, and can be defined by intrinsic and extrinsic camera parameters. For example, intrinsic camera parameters can include focal length, pixel size, and distortion parameters, as well as other alternative or similar parameters. Extrinsic camera parameters can include the camera projection center (e.g., origin) and angular orientation (e.g., omega, phi, kappa, etc.), as well as or other alternative or similar parameters.

Figure 8:
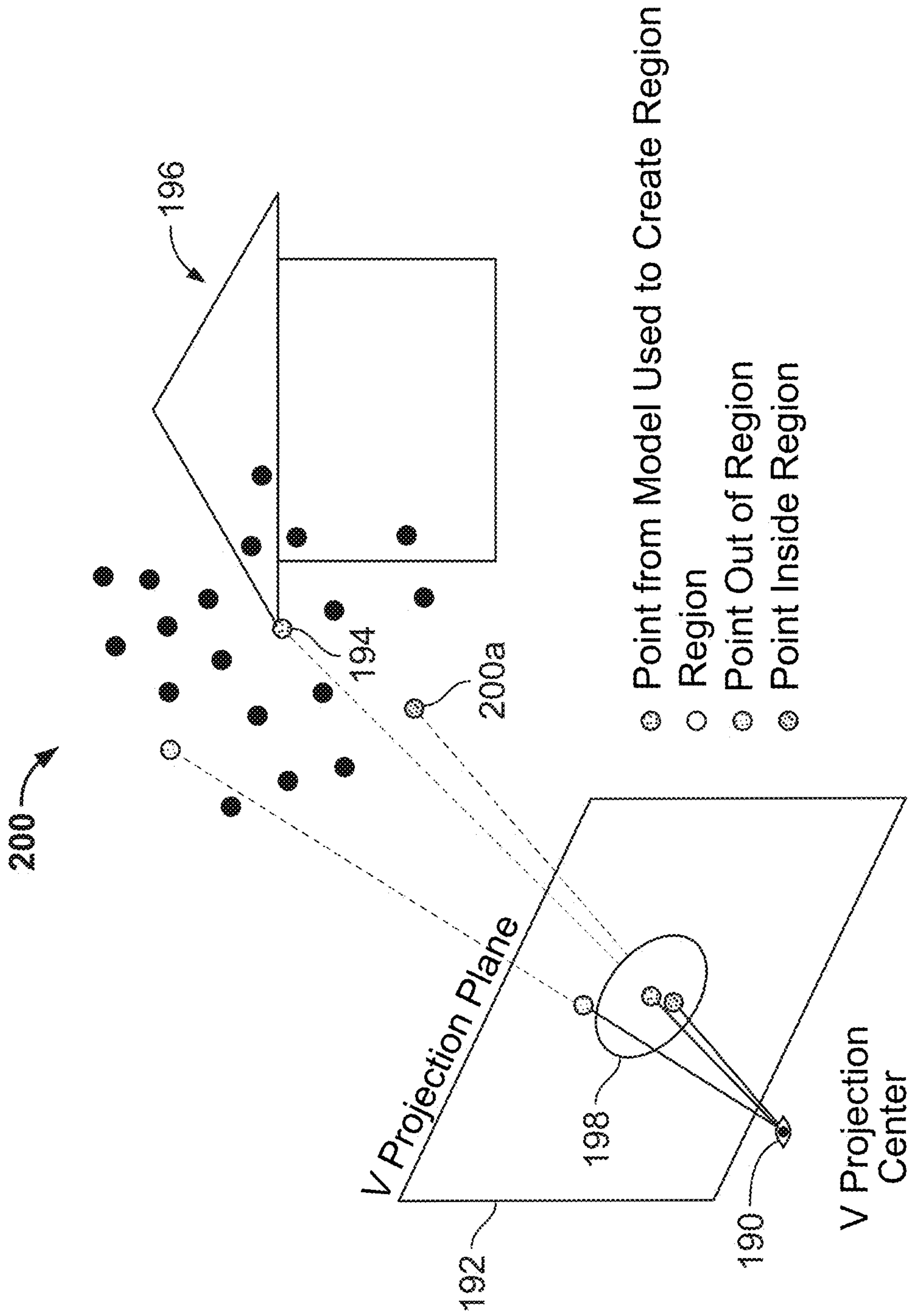
FIG. 8 is a diagram illustrating processing step 110 of FIG. 2 in greater detail.

Returning to FIG. 2, in step 110, the system 10 calculates a best fitting plane for points in the point cloud that correspond to each face of the 3D model. Additional processing steps for calculating the best fitting plane for each face of the 3D model are discussed herein in greater detail, in connection with FIGS. 7 and 8. In step 111, the system 10 identifies a single best fitting plane (e.g., from the group of best fitting planes corresponding to each face of the 3D model) that minimizes error e using the following formula:

$$e = \frac{1}{n}\sum_{i=0}^{i<n} d(p_i)^2$$

where n is the number of points in the set of points falling within the region 198 (e.g., the face of the 3D model), as shown in FIG. 8, and $d(p_i)$ is the distance from each point in the set of points to the projection plane 192, also shown in FIG. 8.

The system 10 then proceeds to step 112, where the system 10 calculates an affine transformation matrix based on the single best fitting plane identified in step 111 and the corresponding face of the 3D model. Additional processing steps for calculating the affine transformation matrix are discussed herein in greater detail, in connection with FIGS. 9-11. In step 114, the system 10 applies the affine transformation matrix to all coordinates of the 3D model, thereby producing a new set of coordinates that are aligned with the point cloud. The system 10 then proceeds to step 118, where the system 10 can generate (e.g., render) a new 3D model of the object (based on the new coordinates from step 114) that is aligned with the georeferenced point cloud, thereby correctly georeferencing the new 3D model in the shared 3D environment (e.g., coordinate system), and the process ends.

As discussed above, the system 10 calculates an affine transformation matrix that is multiplied by all of the coordinates in the 3D model to generate a new 3D model. The new 3D model is transformed in such a way that it substantially matches the point cloud on the shared coordinate system, and are thus substantially aligned from every point of view. The method for creating the affine transformation matrix can be given by: CreateAffineTransformation(Tx, Ty, Tz, S, Sz), which returns a 3D affine transformation defined by the following parameters: a 3D translation Tx, Ty, Tz; a 3D scale factor (affecting all three components, X, Y, Z) S; and a scale in Z component Sz. Accordingly, the resulting matrix can be arranged as the following 3D affine transformation matrix:

$$T = \begin{pmatrix} S & 0 & 0 & T_x \\ 0 & S & 0 & T_y \\ 0 & 0 & S \cdot S_z & T_s \\ 0 & 0 & 0 & 1 \end{pmatrix}$$

The transformation matrix (T) can be applied to the 3D model (M) to generate a new 3D model (M'), given by the equation: M'=M×T. It should be noted that this method does not rotate the 3D model or deform the 3D model, except in the Z scale for a specific stage when Sz is different from 1, discussed in greater detail herein.

Figure 5B:
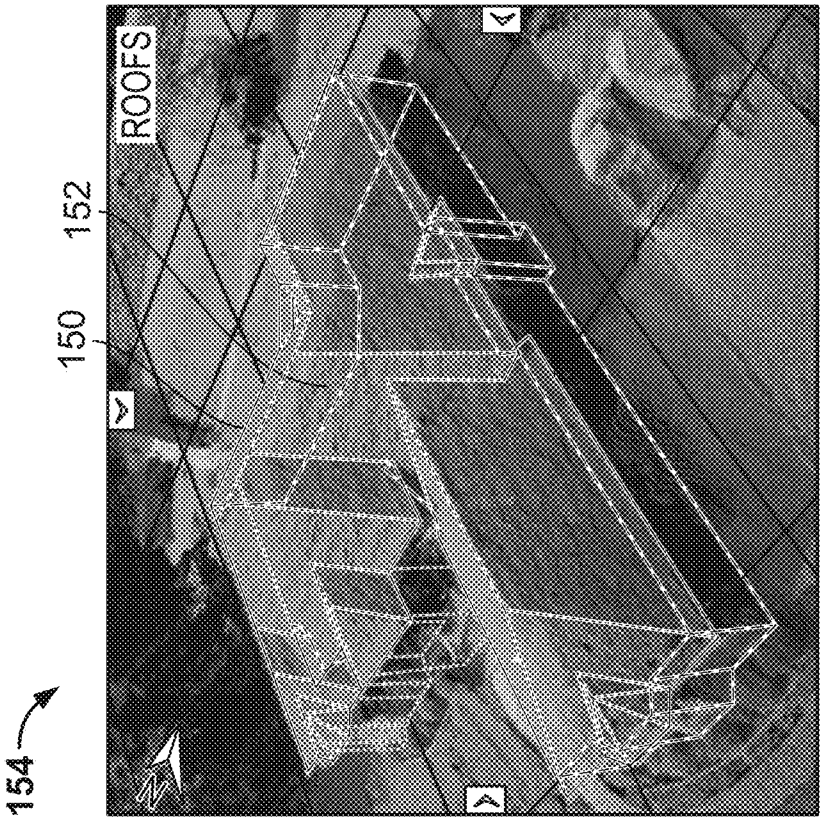
FIGS. 5A-6B are diagrams illustrating processing step 118 of FIG. 2.
Figure 5A:
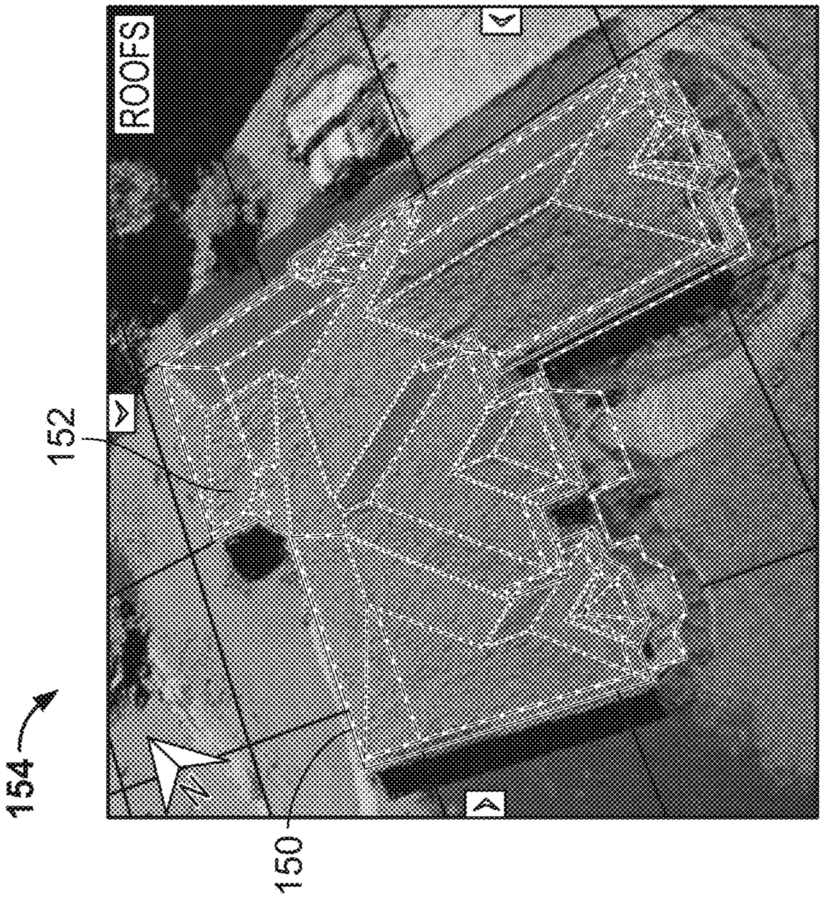

FIGS. 5A-6B are diagrams illustrating the processing step 118 of FIG. 2 and the output of the system 10 of the present disclosure. Specifically, FIG. 5A shows a 3D model 150, transformed according to the processing steps of FIG. 2, and a point cloud 152 rendered in a shared 3D environment 154 and observed from a first perspective point of view and FIG. 5B shows the 3D model 150 and the point cloud 152 rendered in the shared 3D environment 154 and observed from a second (different) perspective point of view. The only difference between FIG. 5A and FIG. 5B is the point of view from which the 3D model 150 and point cloud 152 are observed. It should be understood that point cloud 152 is substantially similar to point cloud 132, discussed in connection with FIGS. 3A and 3B. As shown in FIG. 5A, the 3D model 150 is substantially aligned with the point cloud 152 when observed from the first perspective point of view, and as shown in FIG. 5B, the 3D model 150 is also now aligned with the point cloud 152 when observed from the second perspective point of view (as well as additional points of view not pictured). It should be noted that the 3D model 150 appears substantially similar to the 3D model 130 shown in FIG. 3A, only when viewed from the first perspective view shown in FIGS. 3A and 5A.

Figure 6B:
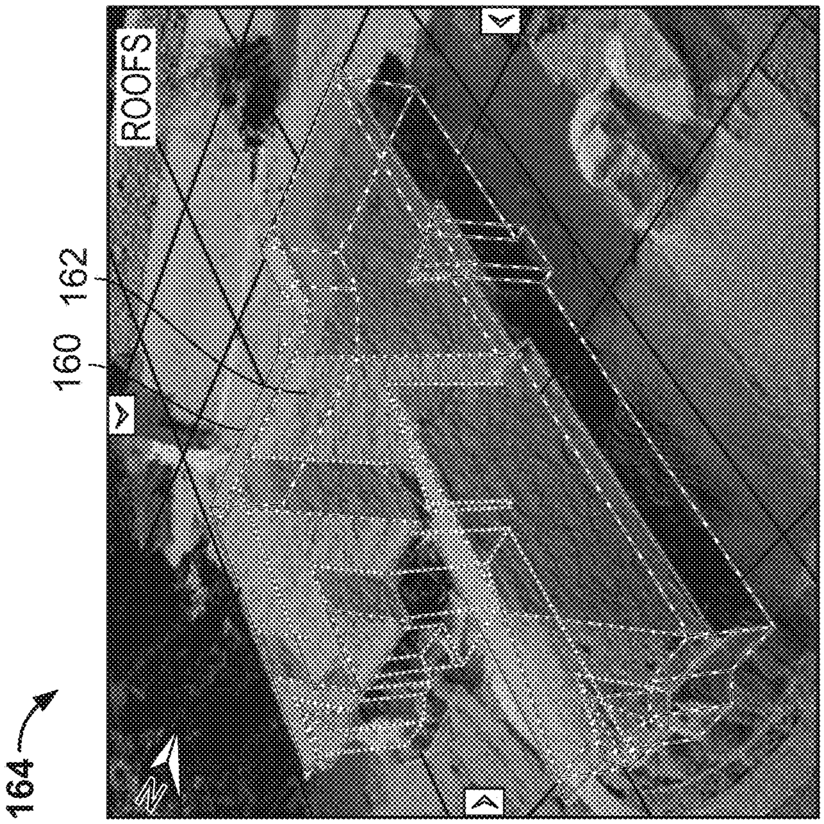
Figure 6A:
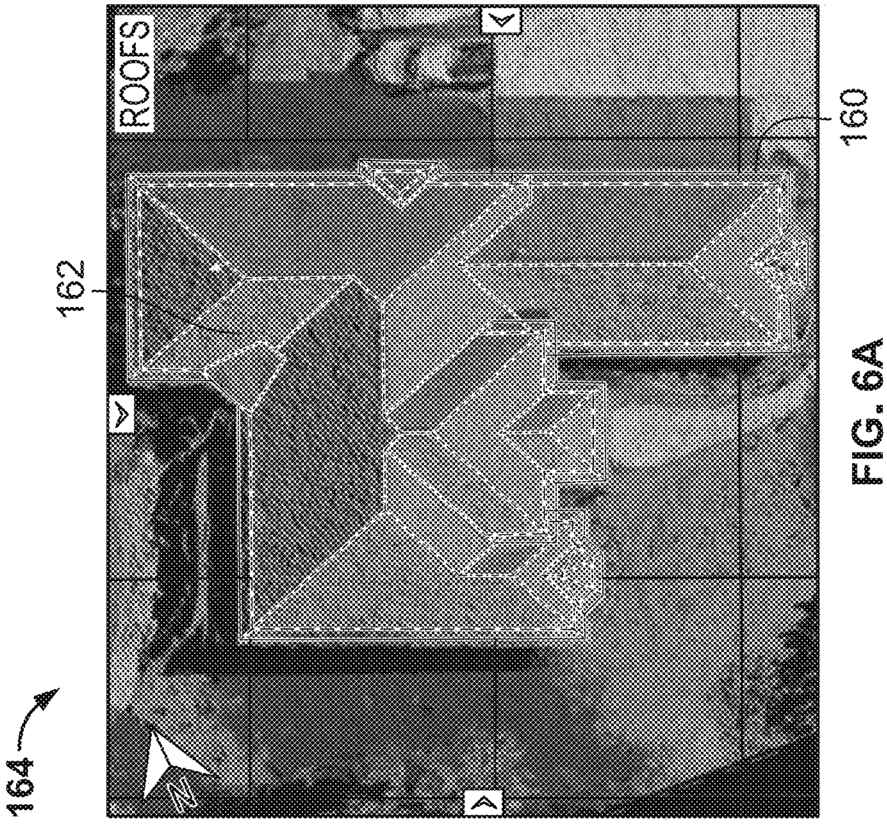

Similarly, FIG. 6A shows a 3D model 160, transformed according to the processing steps of FIG. 2, and a point cloud 162 rendered in a shared 3D environment 164 and observed from a first vertical orthometric point of view, and FIG. 6B shows the 3D model 160 and the point cloud 162 rendered in the shared 3D environment 164 and observed from a second perspective point of view. The only difference between FIG. 6A and FIG. 6B is the point of view from which the 3D model 160 and point cloud 162 are observed. It should be understood that point cloud 162 is substantially similar to point cloud 142, discussed in connection with FIGS. 4A and 4B. As shown in FIG. 6A, the 3D model 160 is substantially aligned with the point cloud 162 when observed from the first vertical orthometric point of view, and as shown in FIG. 6B, the 3D model 160 is also now aligned with the point cloud 162 when observed from the second perspective point of view (as well as additional points of view not pictured). It should be noted that the 3D model 160 appears substantially similar to the 3D model 140 shown in FIG. 4A, only when viewed from the first vertical orthometric view shown in FIGS. 4A and 6A.

Figure 7:
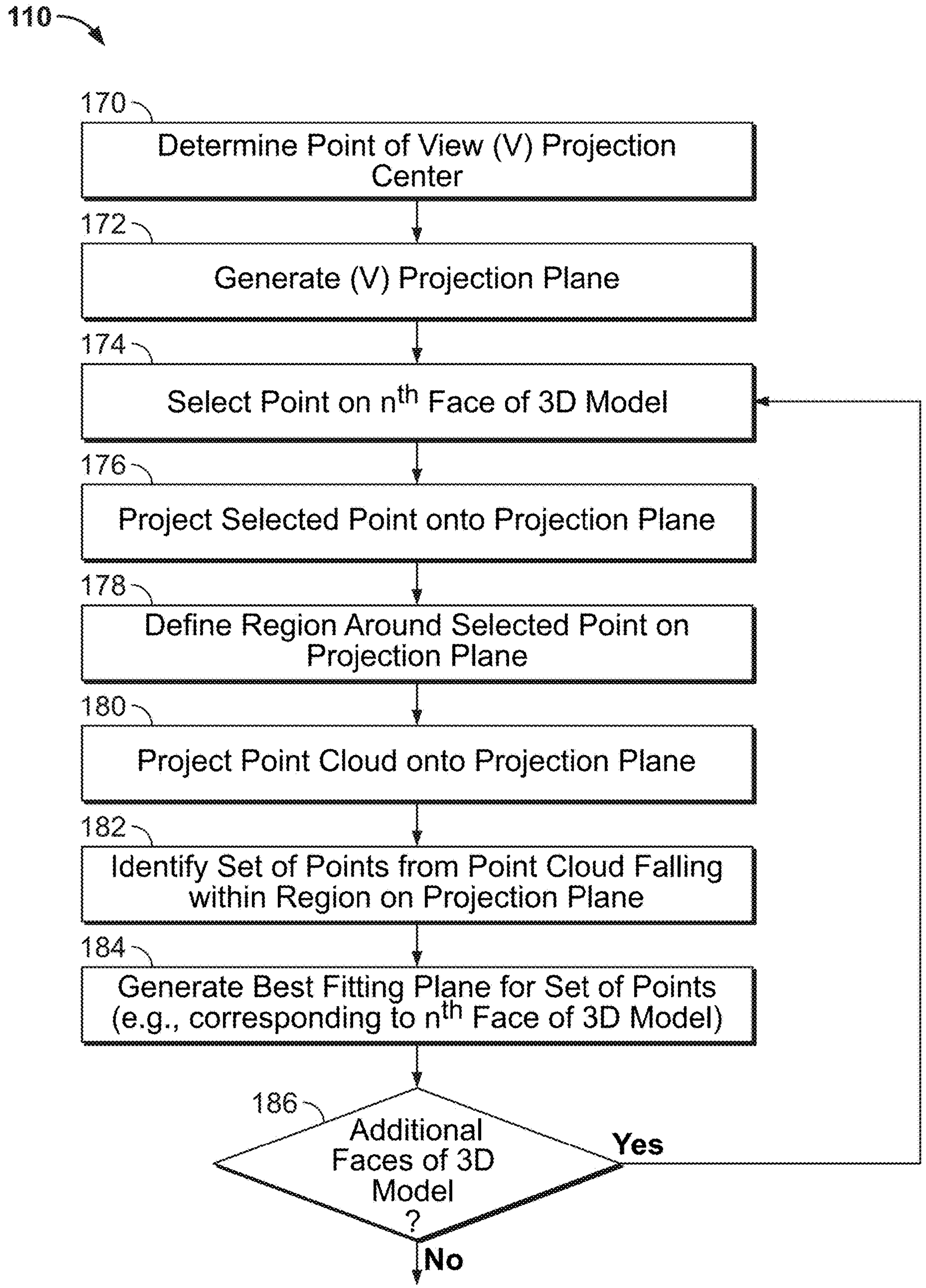
FIG. 7 is a flowchart illustrating processing step 110 of FIG. 2 in greater detail.

FIG. 7 is a flowchart illustrating additional overall process steps 110 carried out by the system 10 of the present disclosure, discussed in connection with step 110 of FIG. 2, for calculating a best fitting plane in the point cloud for each corresponding face of the 3D model and FIG. 8 is a diagram illustrating operation of the processing steps 110. FIGS. 7 and 8 are referred to jointly herein.

In step 170, the system 10 determines the point of view (V) projection center 190. As discussed above, the point of view (V) can be represented as the entire set of parameters that define a point of view and the point of view (V) can be defined by both intrinsic and extrinsic camera parameters. Intrinsic camera parameters can include focal length, pixel size, and distortion parameters, as well as other alternative or similar parameters. Extrinsic camera parameters can include camera projection center and angular orientation (omega, phi, kappa), as well as other alternative or similar parameters. In step 172, the system 10 generates a point of view (V) projection plane 192. In step 174, the system 10 can select a point 194 on a given face of the 3D model 196, or alternatively, the system can receive an input from a user selecting a face of the 3D model 196. In step 176, the system 10 projects the selected point 194 towards the point of view (V) projection center 190 and onto the point of view (V) projection plane 192. In step 178, the system 10 defines a region 198 around the selected point 194 that was projected onto the (V) projection plane 192. For example, the region 198 could correspond to the entire face of the 3D model, or a portion thereof. In step 180, the system 10 projects the point cloud 200 towards the (V) projection center 190 and onto the (V) projection plane 192. In step 182, the system 10 identifies a set of points (e.g., point 200*a*) from the point cloud 200 that were projected onto the (V) projection plane 192 and fall within the region 198. Steps 170-182 for obtaining the set of points from the point cloud falling inside the region when projected onto the (V) projection plane can be given by: PointSelectionFromViewInsideRegion(P, V, R=F), where P corresponds to the point cloud 200, V corresponds to the parameters defining the point of view, R corresponds to the region 198 on the projection plane 192, and F corresponds to a given face of the model 196. The system 10 can then proceed to step 184, where the system 10 generates a best fitting plane (e.g., corresponding to the selected face of the 3D model) based on the set of points in the point cloud 200 falling inside the region 198 when projected onto the (V) projection plane 192. Those of ordinary skill in the art will understand that the best fitting plane can be calculated using well-known algorithms, such as RANSAC. In step 184, the system determines if there are additional faces of the 3D model. If a positive determination is made, the system 10 returns to step 174 and if a negative determination is made, the system 10 proceeds to step 111, discussed herein in connection with FIG. 2. Accordingly, the system 10 performs similar steps to those described above in connection with FIGS. 7 and 8 to generate a best fitting plane for each face of the 3D model 196 before proceeding to step 111.

Figure 9:
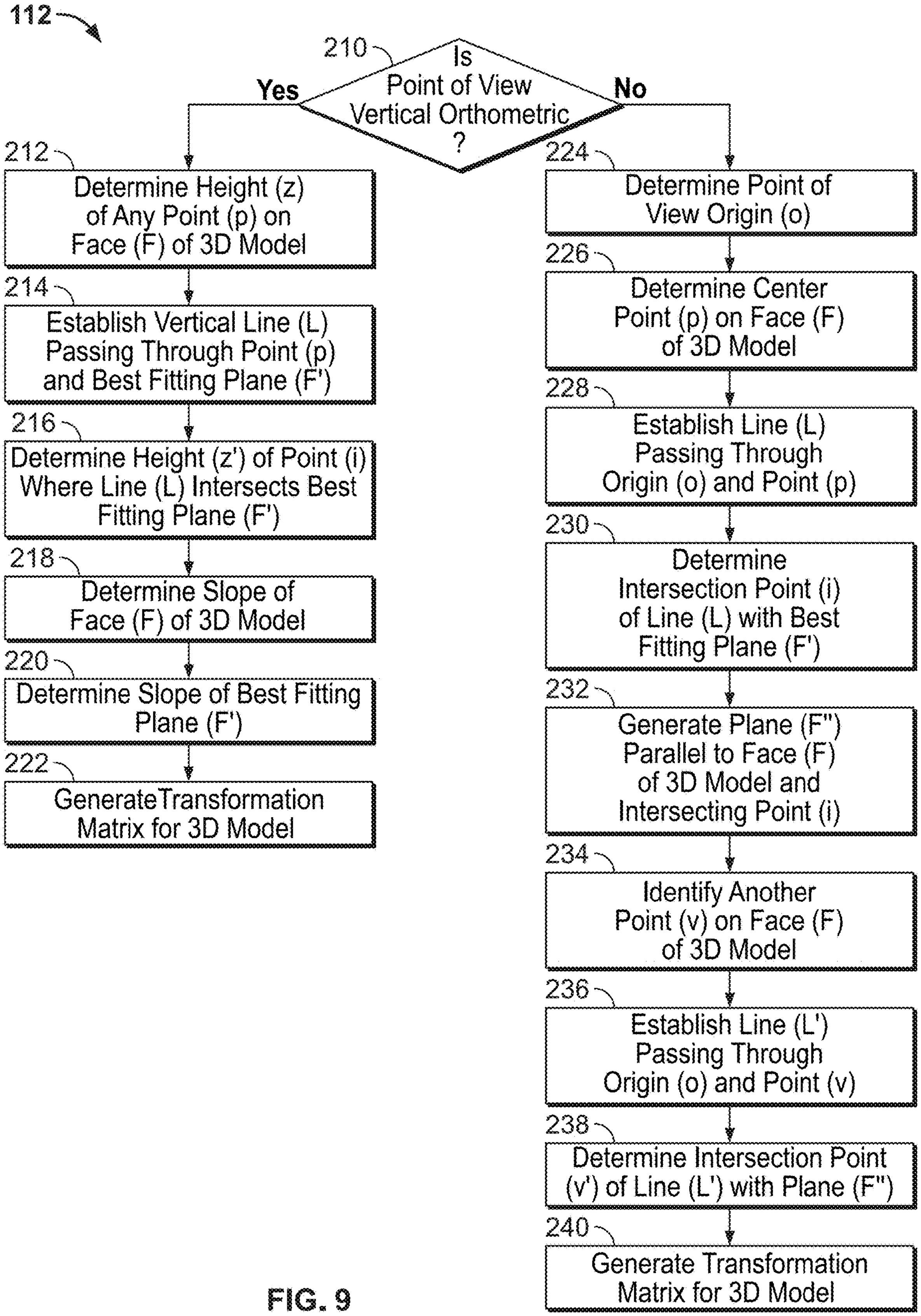
FIG. 9 is a flowchart illustrating processing step 112 of FIG. 2 in greater detail.
Figure 10:
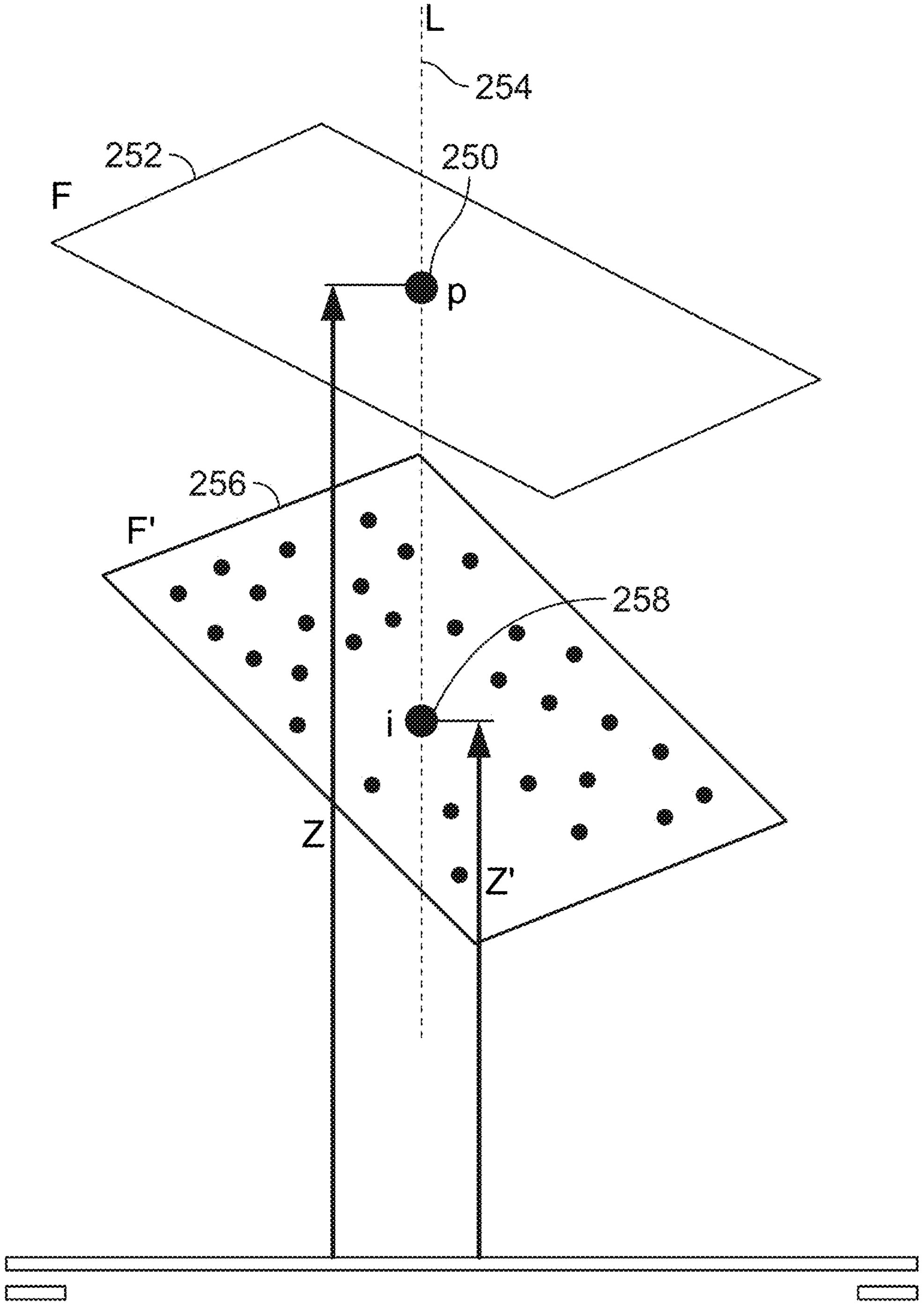
FIG. 10 is a diagram illustrating processing steps 212-222 of FIG. 9 in greater detail.
Figure 11:
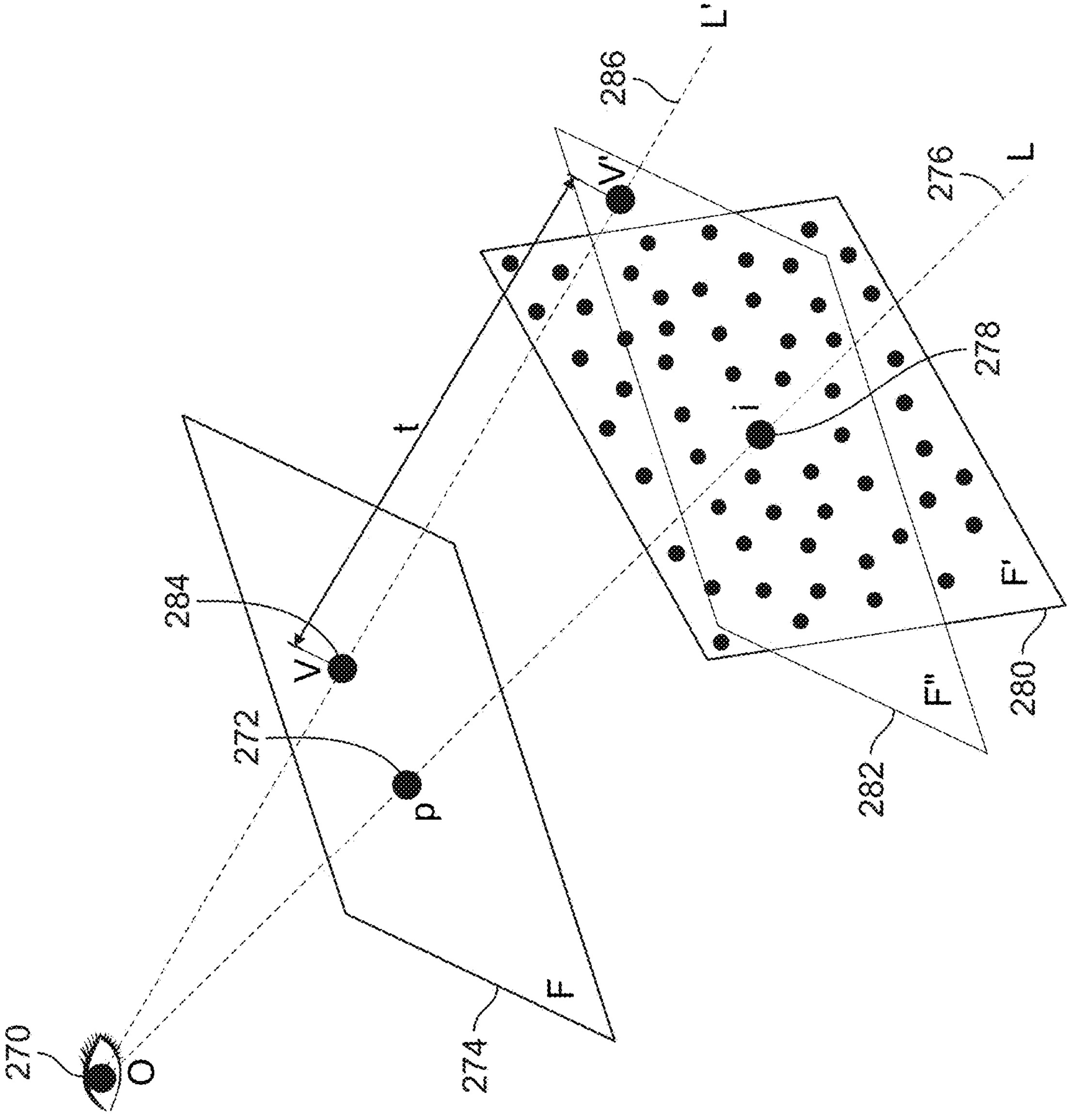
FIG. 11 is a diagram illustrating processing steps 224-240 of FIG. 9 in greater detail.

FIG. 9 is a flowchart illustrating additional overall process steps 112 carried out by the system 10 of the present disclosure, discussed in connection with step 112 of FIG. 2, for calculating an affine transformation matrix based on the best fitting plane (F') of the point cloud and corresponding face (F) of the 3D model, FIG. 10 is a diagram illustrating processing steps 212-222 of FIG. 9, and FIG. 11 is a diagram illustrating processing steps 224-240 of FIG. 9.

In step 210, the system 10 determines if the point of view is a vertical orthometric point of view. If a positive determination is made in step 210, the system 10 proceeds to step 212, where the system determines the height (z) of any point 250 on the face (F) 252 of the 3D model (see FIG. 10). In step 214, the system 10 establishes a vertical line (L) 254 passing through point (p) 250 and the best fitting plane (F') 256 corresponding to the face (F) 252 of the 3D model. In step 216, the system 10 determines the height (z') of point (i) 258, where the vertical line (L) 254 intersects the best fitting plane (F') 256. In step 218, the system 10 determines the slope of the face (F) 252 of the of the 3D model and in step 220, the system 10 determines the slope of the best fitting plane (F') 256. The system 10 can also determine the scale factor (s) in the Z component (Sz) for the transformation matrix (T), which is given by the equation: s=slope(F')/slope (F). The system then proceeds to step 222, where the system 10 generates the affine transformation matrix (T) based on the best fitting plane (F') and corresponding face (F) 252 of the 3D model. The transformation matrix (T) can be given by the equation: T=T1×T2×T3 where:

T1=CreateAffineTransformation(Tx=0, Ty=0, Tz=z', S=1, Sz=1);

T2=CreateAffineTransformation(Tx=0, Ty=0, Tz=0, S=1, Sz=s); and

T3=CreateAffineTransformation(Tx=0, Ty=0, Tz=−z, S=1, Sz=1).

After the system 10 has generated the transformation matrix (T) in step 222, the system 10 can proceed to step 114, discussed above in connection with FIG. 2.

If a negative determination is made in step 210, the system 10 proceeds to step 224, where the system 10 determines the point of view origin (O) 270 (see FIG. 11). In step 226, the system 10 determines a center point (p) 272 on a face (F) 274 of the 3D model. In step 228, the system 10 establishes a line (L) 276 passing through the origin (O) 270 and the center point (p) 272 of the face (F) 274 of the 3D model. In step 230, the system 10 determines an intersection point (i) 278 of the line (L) 276 with a best fitting plane (F') 280 of the point cloud. In step 232, the system 10 generates a plane (F") 282 that is parallel to the face (F) 274 of the 3D model and that also passes through the intersection point (i) 278 of the best fitting plane (F') 280. In step 234, the system 10 identifies another point (v) 284 on the face (F) 274 of the 3D model. In step 236, the system 10 establishes a line (L') 286 that passes through the origin (O) 270 and the point (v) 284 on the face (F) 274 of the 3D model. In step 238, the system 10 determines an intersection point (v') 288 where the line (L') 286 intersects the plane (F") 282. The system then proceeds to step 240, where the system 10 generates an affine transformation matrix (T) based on the best fitting plane (F') and the corresponding face (F) 274 of the 3D model. The transformation matrix (T) can be given by the equation: T=T1×T2×T3 where:

T1=CreateAffineTransformation(Tx=v'.x, Ty=v'.y, Tz=v'.z, S=1, Sz=1);

T2=CreateAffineTransformation(Tx=0, Ty=0, Tz=0, S=s, Sz=1); and

T3=CreateAffineTransformation(Tx=−v.x, Ty=−v.y, Tz=−v.z, S=1, Sz=1).

In the equation above, the scale factor (s) is given by: s=length(v'−O)/length(v−O). After the system 10 has generated the transformation matrix in step 240, the system 10 can proceed to step 114, discussed above in connection with FIG. 2.

Figure 12:
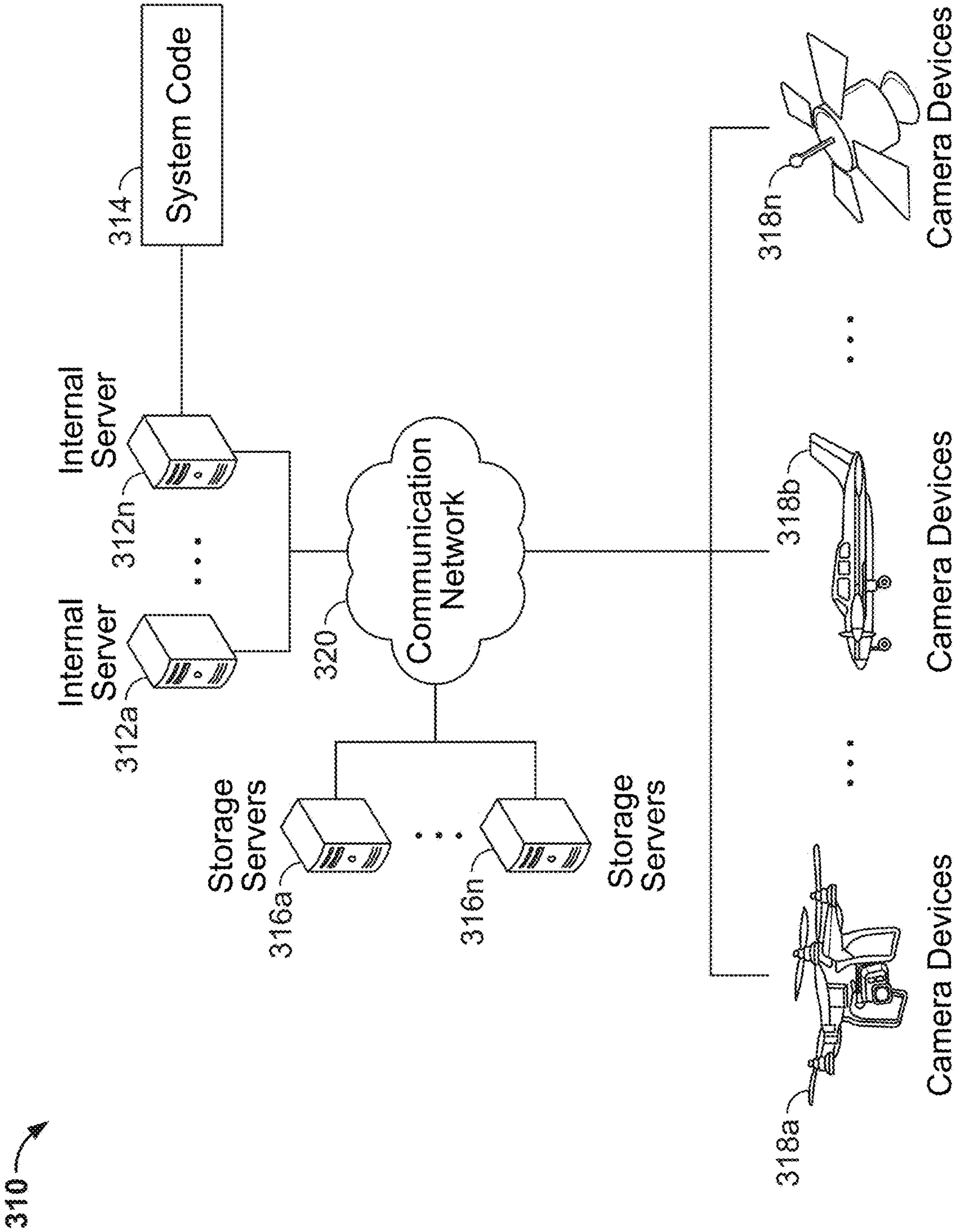
FIG. 12 is a diagram illustrating another hardware and software configuration of the system of the present disclosure.

FIG. 12 is a diagram illustrating computer hardware and network components on which a system 310 of the present disclosure could be implemented. The system 310 can include a plurality of internal servers **312*a*-312*n* having at least one processor and memory for executing the computer instructions and methods described above (which could be embodied as system code 314). The system 310 can also include a plurality of storage servers 316*a*-316*n* for receiving and storing one or more 3D models and/or point cloud data. The system 310 can also include a plurality of camera devices 318*a*-318*n* for capturing images used to generate the point cloud data and/or 3D models. For example, the camera devices can include, but are not limited to, an unmanned aerial vehicle 318*a*, an airplane 318*b*, and a satellite 318*n*. The internal servers 312*a*-312*n*, the storage servers 316*a*-316*n*, and the camera devices 318*a*-318*n* can communicate over a communication network 320. Of course, the system 310 need not be implemented on multiple devices, and indeed, the system 310** could be implemented on a single computer system (e.g., a personal computer, server, mobile computer, smart phone, etc.) without departing from the spirit or scope of the present disclosure.

Figure 13:
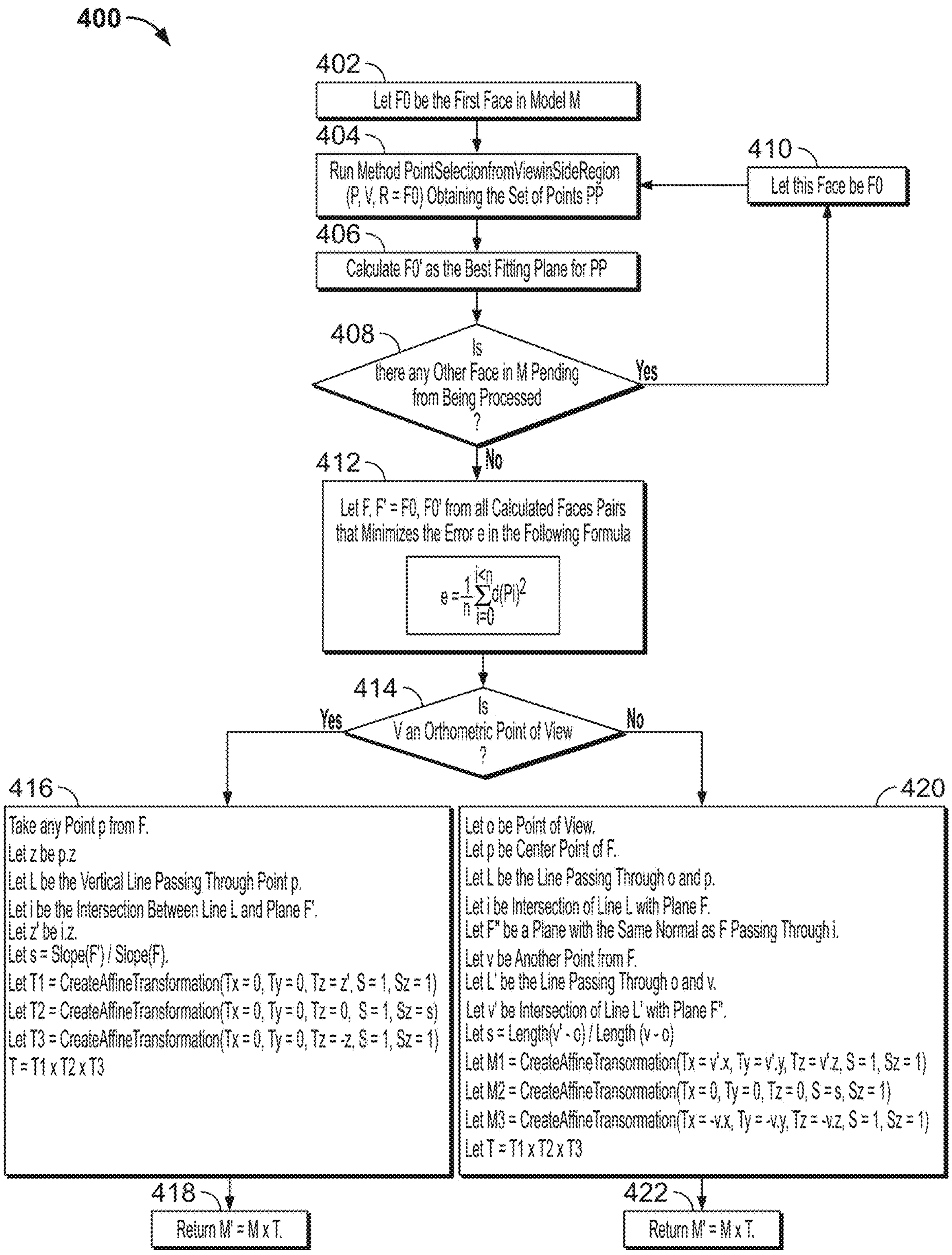
FIG. 13 is another flowchart illustrating overall process steps carried out according to embodiments of the present disclosure.

FIG. 13 is a another flowchart illustrating overall process steps 400, according to embodiments of the present disclosure, which can be carried out by the systems disclosed herein (e.g., system 10 and system 310), or systems otherwise known. It is noted that the overall process steps 400 shown in FIG. 13 can be substantially similar to, and inclusive of, process steps 110-118, discussed in connection with FIGS. 2-11 of the present disclosure, but are not limited thereto.

As shown in step 402, a system of the present disclosure identifies a first face of the 3D model, where (F0) is the first face in model (M). In step 404, the system executes code (e.g., system code 18) to carry out a method for obtaining a set of points (PP), given by: PointSelectionFromViewInsideRegion(P, V, R=F0), where (P) corresponds to the point cloud (e.g., point cloud 200, discussed in connection with FIG. 8), (V) corresponds to the parameters defining the point of view, and (R) corresponds to a region on the projection plane (e.g., region 198 on plane 192, discussed in connection with FIG. 8). In step 406, the system calculates (F0') as the best fitting plane for (PP). In step 408, the system determines if there is any other face in (M) that is pending and needs to be processed. If a positive determination is made in step 408, the system identifies the pending face as (F0) in step 410, and the process then returns to step 404. If a negative determination is made in step 408, the system proceeds to step 412, identifying a best fitting face, where F, F'=F0, F0', from all calculated faces pairs that minimizes the error e in the following formula:

$$e = \frac{1}{n}\sum_{i=0}^{i<n} d(p_i)^2$$

where n is the number of points in the set of points falling within the region (R) and $d(p_i)$ is the distance from each point in the set of points to the projection plane (e.g., plane 192, discussed in connection with FIG. 8). In step 414, the system determines if (V) is an orthometric point of view. If a positive determination is made in step 414, the system proceeds to step 416 and generates a transformation matrix (T), given the following parameters (e.g., discussed in connection with FIG. 10), where (p) can be any point on the face (F):

Let z be p.z;
Let L be the vertical line passing through point p;
Let i be the intersection between line L and plane F';
Let z' be i.z;
Let s=slope(F')/slope(F);
Let T1=CreateAffineTransformation(Tx=0, Ty=0, Tz=z', S=1, Sz=1);
Let T2=CreateAffineTransformation(Tx=0, Ty=0, Tz=0, S=1, Sz=s);
Let T3=CreateAffineTransformation(Tx=0, Ty=0, Tz=−z, S=1, Sz=1); and
T=T1×T2×T3.

In step 418, the system applies the transformation matrix (T) to the 3D model (M) to generate a new 3D model (M'), given by the equation: M'=M×T.

If a negative determination is made in step 414, the system proceeds to step 420 and generates a transformation matrix (T), given the following parameters (e.g., discussed in connection with FIG. 11):

Let o be point of view;
Let p be center point of F;
Let L be the line passing through o and p;
Let i be intersection of line L with plane F;
Let F" be a plane with the same normal as F passing through i;
Let v be another point from F;
Let L' be the line passing through o and v;
Let v' be the intersection of line L' with plane F";
Let s=length(v'−o)/length(v−o);
Let M1=CreateAffineTransformation(Tx=v'.x, Ty=v'.y, Tz=v'.z, S=1, Sz=1);
Let M2=CreateAffineTransformation(Tx=0, Ty=0, Tz=0, S=s, Sz=1);
Let M3=CreateAffineTransformation(Tx=−v.x, Ty=−v.y, Tz=−v.z, S=1, Sz=1); and
Let T=T1×T2×T3.

In step 422, the system applies the transformation matrix (T) to the 3D model (M) to generate a new 3D model (M'), given by the equation: M'=M×T. The process 400 then ends.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A system for adjusting a three-dimensional model of an object to conform to a point cloud, comprising:
a first database storing a 3D model corresponding to an object;
a second database storing a georeferenced point cloud corresponding to the object; and
a processor in communication with the first and second databases, the processor:
retrieving the 3D model from the first database;
retrieving the georeferenced point cloud from the second database;
rendering the 3D model and the georeferenced point cloud in a shared 3D coordinate system, such that a selected point on a face of the 3D model is projected onto a point-of-view projection plane as a projection center of the point-of-view projection plane;
projecting a plurality of points of the georeferenced point cloud into the point-of-view projection plane;
calculating an affine transformation matrix based on a subset of the plurality of points of the georeferenced point cloud projected onto the point-of-view projection plane that fall within a region on the point-of-view projection plane defined around the projection center of the point-of-view projection plane; and
applying the affine transformation matrix to the 3D model to generate a new 3D model that aligns with the georeferenced point cloud,
wherein the affine transformation matrix does not cause rotation or deformation of the 3D model when the affine transformation matrix is applied to the 3D model, and the new 3D model matches the georeferenced point cloud when observed from any point of view, wherein matching of the new 3D model to the georeferenced point cloud causes a geolocation of the 3D model to be correct.

2. The System of claim 1, wherein the processor calculates a best fitting plane of the point cloud for each corresponding face of the 3D model.

3. The system of claim 2, wherein the processor calculates the best fitting plane based on the subset of the plurality of points within the region, the best fitting plane corresponding to the face of the 3D model.

4. The system of claim 2, wherein the processor identifies a single best fitting plane minimizing error between each best fitting plane of the point cloud and each corresponding face of the 3D model.

5. The system of claim 4, wherein the processor calculates the affine transformation matrix based on the single best fitting plane of the point cloud and the corresponding face of the 3D model.

6. The system of claim 1, wherein the processor generates the point-of-view projection plane based on a point of view where the 3D model and the georeferenced point cloud are aligned.

7. The system of claim 1, wherein the processor applies the affine transformation matrix to all coordinates of the 3D model, thereby producing a new set of coordinates that are aligned with the point cloud.

8. The system of claim 1, wherein the affine transformation matrix includes a 3D translation component, a 3D scale factor component, and a vertical scale factor component.

9. The system of claim 1, wherein the affine transformation matrix is calculated based on: (1) a face of the 3D model and (2) a fitting plane that is calculated from the point cloud and which includes points of the point cloud that correspond to the face of the 3D model.

10. A method for adjusting a three-dimensional model of an object to conform to a point cloud, comprising the steps of:

receiving at a processor a 3D model corresponding to an object;

receiving at the processor a georeferenced point cloud corresponding to the object;

rendering the 3D model and the georeferenced point cloud in a shared 3D coordinate system, such that a selected point on a face of the 3D model is projected onto a point-of-view projection plane as a projection center of the point-of-view projection plane;

projecting a plurality of points of the georeferenced point cloud into the point-of-view projection plane;

calculating an affine transformation matrix based on a subset of the plurality of points of the georeferenced point cloud projected onto the point-of-view projection plane that fall within a region on the point-of-view projection plane defined around the projection center of the point-of-view projection plane; and applying the affine transformation matrix to the 3D model to generate a new 3D model that aligns with the georeferenced point cloud, wherein the affine transformation matrix does not cause rotation or deformation of the 3D model when the affine transformation matrix is applied to the 3D model, and the new 3D model matches the georeferenced point cloud when observed from any point of view, wherein matching of the new 3D model to the georeferenced point cloud causes a geolocation of the 3D model to be correct.

11. The method of claim 10, wherein the step of calculating the affine transformation matrix comprises calculating a best fitting plane of the point cloud for each corresponding face of the 3D model.

12. The method of claim 11, further comprising the step of identifying a single best fitting plane minimizing error between each best fitting plane of the point cloud and each corresponding face of the 3D model.

13. The method of claim 12, comprising calculating the affine transformation matrix based on the single best fitting plane of the point cloud and the corresponding face of the 3D model.

14. The method of claim 10, further comprising the step of generating the point-of-view projection plane based on a point of view where the 3D model and the georeferenced point cloud are aligned.

15. The method of claim 10, further comprising the step of:

calculating a best fitting plane based on the subset of the plurality of points within the region, the best fitting plane corresponding to the face of the 3D model.

16. The method of claim 10, wherein the step of applying the affine transformation matrix to the 3D model comprises applying the affine transformation matrix to all coordinates of the 3D model, thereby producing a new set of coordinates that are aligned with the point cloud.

17. The method of claim 10, wherein the affine transformation matrix includes a 3D translation component, a 3D scale factor component, and a vertical scale factor component.

18. The method of claim 10, wherein the affine transformation matrix is calculated based on: (1) a face of the 3D model and (2) a fitting plane that is calculated from the point cloud and which includes points of the point cloud that correspond to the face of the 3D model.

19. A non-transitory computer readable medium having instructions stored thereon for adjusting a three-dimensional model of an object to conform to a point cloud which, when executed by a processor, causes the processor to carry out the steps of:

receiving a 3D model corresponding to an object;

receiving a georeferenced point cloud corresponding to the object;

rendering the 3D model and the georeferenced point cloud in a shared 3D coordinate system, such that a selected point on a face of the 3D model is projected onto a point-of-view projection plane as a projection center of the point-of-view projection plane;

projecting a plurality of points of the georeferenced point cloud into the point-of-view projection plane;

calculating an affine transformation matrix based on a subset of the plurality of points of the georeferenced point cloud projected onto the point-of-view projection plane that fall within a region on the point-of-view projection plane defined around the projection center of the point-of-view projection plane; and applying the affine transformation matrix to the 3D model to generate a new 3D model that aligns with the georeferenced point cloud, wherein the affine transformation matrix does not cause rotation or deformation of the 3D model when the affine transformation matrix is applied to the 3D model, and the new 3D model matches the georeferenced point cloud when observed from any point of view wherein matching of the new 3D model to the georeferenced point cloud causes a geolocation of the 3D model to be correct.

20. The non-transitory computer readable medium of claim 19, wherein the step of calculating the affine transformation matrix comprises calculating a best fitting plane of the point cloud for each corresponding face of the 3D model.

21. The non-transitory computer readable medium of claim 20, further comprising the step of identifying a single best fitting plane minimizing error between each best fitting plane of the point cloud and each corresponding face of the 3D model.

22. The non-transitory computer readable medium of claim 21, comprising calculating the affine transformation matrix based on the single best fitting plane of the point cloud and the corresponding face of the 3D model.

23. The non-transitory computer readable medium of claim 19, further comprising the step of generating the point-of-view projection plane based on a point of view where the 3D model and the georeferenced point cloud are aligned.

24. The non-transitory computer readable medium of claim 19, further comprising the step of:

calculating a best fitting plane based on the subset of the plurality of points within the region, the best fitting plane corresponding to the face of the 3D model.

25. The non-transitory computer readable medium of claim 19, wherein the step of applying the affine transformation matrix to the 3D model comprises applying the affine transformation matrix to all coordinates of the 3D model, thereby producing a new set of coordinates that are aligned with the point cloud.

26. The non-transitory computer readable medium of claim 19, wherein the affine transformation matrix includes a 3D translation component, a 3D scale factor component, and a vertical scale factor component.

27. The computer-readable medium of claim 19, wherein the affine transformation matrix is calculated based on: (1) a face of the 3D model and (2) a fitting plane that is calculated from the point cloud and which includes points of the point cloud that correspond to the face of the 3D model.

* * * * *